US011769236B2

United States Patent
Amthor et al.

(10) Patent No.: US 11,769,236 B2
(45) Date of Patent: Sep. 26, 2023

(54) MICROSCOPY SYSTEM AND METHOD FOR GENERATING AN HDR IMAGE

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 32 days.

(21) Appl. No.: 17/467,582

(22) Filed: Sep. 7, 2021

(65) Prior Publication Data

US 2022/0076395 A1 Mar. 10, 2022

(30) Foreign Application Priority Data

Sep. 9, 2020 (DE) .................... 10 2020 123 504.6

(51) Int. Cl.
*G06T 5/50* (2006.01)
*G02B 21/36* (2006.01)

(52) U.S. Cl.
CPC .............. *G06T 5/50* (2013.01); *G02B 21/361* (2013.01); *G02B 21/367* (2013.01); *G06T 2207/10056* (2013.01); *G06T 2207/20084* (2013.01); *G06T 2207/20208* (2013.01)

(58) Field of Classification Search
None
See application file for complete search history.

(56) References Cited

U.S. PATENT DOCUMENTS

| 9,274,328 | B2 | 3/2016 | Kaminaga | |
|---|---|---|---|---|
| 2010/0150473 | A1* | 6/2010 | Kwon | .................... G06T 5/50 382/284 |
| 2014/0313312 | A1 | 10/2014 | Gaiduk et al. | |

(Continued)

FOREIGN PATENT DOCUMENTS

| CN | 104299213 A | * | 1/2015 |
|---|---|---|---|
| DE | 102013006994 A1 | | 10/2014 |

(Continued)

OTHER PUBLICATIONS

Wickborn, DE Application No. 102020123504.6, Search Report, dated Jun. 8, 2021, 6 pages (English translation not available).

(Continued)

*Primary Examiner* — Dave Czekaj
*Assistant Examiner* — Shanika M Brumfield
(74) *Attorney, Agent, or Firm* — LaBatt, LLC (57) ABSTRACT

A microscopy system for generating an HDR image comprises a microscope for capturing a plurality of raw images that show a scene with different image brightnesses and a computing device configured to generate the HDR image by combining at least two of the raw images. The computing device is also configured to set coefficients for different regions in the raw images depending on objects depicted in those regions, wherein it is defined via the coefficients whether and to what extent pixels of the raw images are incorporated in the HDR image. The computing device is further configured to generate the HDR image by combining the raw images based on the set coefficients. A method generates an HDR image by combining raw images based on coefficients that are set depending on objects depicted in the raw images.

20 Claims, 4 Drawing Sheets

(56) References Cited

U.S. PATENT DOCUMENTS

| | | | |
|---|---|---|---|
| 2017/0330336 A1* | 11/2017 | Roblek | ............... G06F 16/434 |
| 2018/0189610 A1 | 7/2018 | Kandemir et al. | |
| 2019/0347776 A1 | 11/2019 | Chou et al. | |
| 2020/0057291 A1 | 2/2020 | Haase et al. | |
| 2020/0088984 A1 | 3/2020 | Haase et al. | |
| 2020/0371333 A1 | 11/2020 | Amthor et al. | |
| 2020/0371335 A1 | 11/2020 | Amthor et al. | |
| 2021/0125317 A1* | 4/2021 | Asayama | ............... G06T 5/009 |
| 2021/0133966 A1 | 5/2021 | Fuchs et al. | |
| 2021/0160434 A1 | 5/2021 | Amthor et al. | |
| 2022/0043251 A1 | 2/2022 | Moore et al. | |
| 2022/0345606 A1* | 10/2022 | Sato | ............... H04N 9/04551 |
| 2022/0385809 A1* | 12/2022 | Kai | ............... H04N 5/225 |

FOREIGN PATENT DOCUMENTS

| | | |
|---|---|---|
| DE | 102017109698 A1 | 11/2018 |
| DE | 102017111718 A1 | 12/2018 |
| DE | 102019114117 B3 | 8/2020 |
| DE | 102019113540 A1 | 11/2020 |
| DE | 102019114012 A1 | 11/2020 |
| DE | 102019131678 A1 | 5/2021 |

OTHER PUBLICATIONS

Dr. Hoffman, DE Application No. 102020123505.4, Search Report, dated Jan. 3, 2021, 6 pages (English translation not available).

Yin, Zhaozheng et al., "Cell-Sensitive Microscopy Imaging for Cell Image Segmentation," Stanford University, MICCAI 2014, Part I, LNCS 8673, pp. 41-48, 2014, 8 pages.

Yuma, Kinoshita et al., "Scene Segmentation-Based Luminance Adjustment for Multi-Exposure Image Fusion," Journal of Latex Class Files, vol. 14, No. 8, Aug. 2015, 16 pages.

Office action for U.S. Appl. No. 17/467,578, dated Nov. 28, 2022, 15 pages.

Final Office action for U.S. Appl. No. 17/467,578, dated Jun. 7, 2023, 17 pages.

* cited by examiner

MICROSCOPY SYSTEM AND METHOD FOR GENERATING AN HDR IMAGE

REFERENCE TO RELATED APPLICATIONS

The current application claims the benefit of German Patent Application No. 10 2020 123 504.6, filed on 9 Sep. 2020, which is hereby incorporated by reference.

FIELD OF THE DISCLOSURE

The present disclosure relates to a microscopy system and a method for generating an HDR image.

An HDR image (high-dynamic-range image) is generally understood in the present disclosure to denote an image which is calculated from a plurality of superposed raw images and which contains more image information than any single raw image among said plurality of superposed raw images. The raw images for an HDR image or pseudo HDR image are often captured with different luminosities or camera shutter speeds (exposure fusion). In the sense of the present disclosure, however, an HDR image can also be generated using raw images in which differences in image brightness can stem from in principle any other differences in image capture.

BACKGROUND OF THE DISCLOSURE

In modern microscopy systems, digital image processing is playing an increasingly important role in the acquisition of high-quality images of samples or sample carriers.

It is known to combine a plurality of images (raw images in the following) into a high-quality aggregate image or HDR image for this purpose. A generic microscopy system for generating an HDR image accordingly comprises a microscope for capturing a plurality of raw images that show a scene with different image brightnesses and a computing device which is configured to generate the HDR image by combining at least two of the raw images. Such a microscopy system is described, for example, in U.S. Pat. No. 9,274,328 B2 or by the Applicant in DE 10 2017 111 718 A1.

A generic method for generating an HDR image analogously includes the acquisition of a plurality of raw images that show a scene with different image brightnesses. The HDR image is generated by means of a combination of at least two of the raw images. Such a method can be carried out in conjunction with in principle any image capture device or also separately from the image capturing device.

An advanced embodiment of the basic HDR principle was described by Yuma Kinoshita and Hitoshi Kiya in "Scene Segmentation-Based Luminance Adjustment for Multi-Exposure Image Fusion", published in arXiv preprint 1903.07428v1 on Mar. 18, 2019. In the method described in this document, each of the raw images is divided into different image segments based on its luminance values, cf. FIG. 11. A raw image is split, for example, into three image segments, wherein one image segment comprises all dark pixels, the second image segment comprises all medium-bright pixels and the third image segment comprises all bright pixels. An HDR image is then generated via a weighted calculation of the image segments of different raw images.

SUMMARY OF THE DISCLOSURE

It can be considered an object of the invention to provide a microscopy system and a method which can calculate an optimum-quality aggregate image, without any interfering image artefacts, from a plurality of raw images.

This object is achieved by means of the microscopy system with the features of claim 1 and by means of the method with the features of claim 2.

According to the invention, in the microscopy system of the aforementioned type, the computing device is configured to set coefficients for different regions in the raw images depending on objects depicted in those regions. The coefficients are used to define whether or to what extent pixels of the raw images are incorporated in the HDR image. The computing device is configured to generate the HDR image by combining the raw images based on the set coefficients.

According to the invention, in the method of the aforementioned type, coefficients are set for different regions in the raw images depending on objects depicted in those regions. The coefficients are used to define whether or to what extent (e.g., percent value) pixels of the raw images are incorporated in the HDR image. The HDR image is generated by combining the raw images based on the set coefficients.

While the determination of which image areas from which raw images are fused into the HDR image is based on image brightness in the prior art, this determination is made based on the depicted objects according to the invention. An object-based fusion allows ideal display characteristics to be selected for a particular object, which, compared with a determination based on the raw images in their entirety, can be advantageous for the depiction of objects. In particular, distortions of brightness information within the same object can be avoided. It can also be ruled out that the quality of an object aptly displayed in one of the raw images is impaired by a superposition with other raw images. An object-based evaluation also allows different objects from the raw images to be included in the HDR image according to different criteria, as described in greater detail later on.

The invention does not require special hardware, in particular special and cost-intensive HDR camera sensors.

OPTIONAL EMBODIMENTS

Advantageous variants of the microscopy system according to the invention and of the method according to the invention are the object of the dependent claims and are explained in the following description.

The processing steps described can be implemented in an automated manner by an image processing program, which can in particular comprise one or more trained machine learning models, as described in greater detail in the following.

Semantic Regions

In order to set coefficients for different regions, it can be provided that semantic regions are first determined in the raw images by dividing each raw image into regions and assigning each region a semantic label. Coefficients can then be derived for each of the raw images depending on at least the semantic labels of included semantic regions. A semantic label is understood to denote a meaning of the image content, i.e. of one or more depicted objects, assigned to the corresponding region. The semantic labels make it possible to differentiate between a plurality of predefined classes, in particular between two or more of the following classes: sample carrier, cover slip, sample, holding frame and background. A further subdivision into a plurality of different classes of samples can also be provided in order to differentiate between, e.g., microscopic samples that require different exposure conditions. Different pixels with the same brightness in a raw image are thus generally not treated in the same manner, but as a function of the semantic label to which they correspond.

The determination of semantic regions in the raw images can occur by means of a machine learning model trained for this purpose. A trained machine learning model is understood to denote a model with model parameters whose values have been defined using training data. This definition occurs by means of a learning algorithm with which an objective function is typically optimized, for example a loss function is minimized. The loss function depends on differences between predetermined target values (in the case of labelled training data of a supervised learning process) and an output calculated from the training data with current model parameter values. The model parameter values are adjusted iteratively so as to minimize the loss function. The objective function can also comprise a reward function instead of a loss function and be maximized.

The machine learning model can be formed, e.g., by one or more neural networks and comprise in particular a CNN (convolutional neural network). In this case, model parameters comprise entries of convolutional matrices. Example embodiments of the machine learning model are or comprise a semantic segmentation machine learning model, an instance segmentation machine learning model or a detection machine learning model. A semantic segmentation corresponds to a pixel-by-pixel classification of structures or objects in the raw image. Each image pixel of a raw image is thus assigned to one of a plurality of predetermined classes of objects. In the case of an instance segmentation machine learning model, a pixel-by-pixel classification also occurs and, in addition, a plurality of objects of the same class are differentiated. For example, the raw images can respectively show a sample carrier with two or more microscopic samples. A classification comprises the classes, e.g., sample carrier, sample and background, whereby the two microscopic samples belong to the same class. By means of an instance segmentation, the two microscopic samples are also differentiated from one another so that it is possible to determine different coefficients for the image segments of the two samples, wherein an image fusion occurs based on the respective determined coefficients. In the case of a detection machine learning model, the machine learning model is trained to detect a plurality of predetermined objects in the raw images and to output coordinates of the detected objects together with corresponding object designations. The coordinates can describe an object perimeter, in particular a (rectangular) border of detected objects.

The manner in which raw images are segmented can be determined based on all of the raw images or based solely on a single raw image or some of the raw images. For example, it can be provided that only one of the raw images or a portion of the raw images is input into the machine learning model, which thereby calculates a segmentation mask. A division into semantic regions according to the calculated segmentation mask can now occur for all raw images, i.e. including the raw images which were not used in the determination of the segmentation mask. In a segmentation mask, a pixel value denotes a particular class so that the number of different pixel values corresponds to the number of detected classes. If the raw images were captured with an identical field of view, objects (e.g. a sample carrier) are located in the same position in each raw image. A segmentation mask generated from one of the raw images is consequently generally also applicable to the other raw images and does not have to be calculated separately for each raw image. In order to utilize image information from a plurality of raw images for the determination of a segmentation mask, it is also possible to input an aggregation of a plurality or all of the raw images, e.g. an average or sum of all raw images, into the machine learning model in order to calculate a segmentation mask therefrom. Instead of a single neural network performing a semantic segmentation for all desired classes, it is also possible for a plurality of neural networks to each perform a semantic segmentation in parallel, the networks respectively differing in terms of the classes of objects that can be detected and segmented. For example, one neural network can create a binary segmentation mask in which sample areas and a background are differentiated, while another neural network calculates a binary segmentation mask in which a sample carrier and a background are differentiated.

The determination of the semantic labels can occur more generally based on one or more of the raw images or based on another image that is not incorporated in the HDR image. Such another image can be generated, e.g., using a different capture mode, in particular a different contrast method. For example, a phase-contrast image can be captured with the microscope in which sample areas are more clearly visible so that it is possible to determine which sample types are contained in the image. This advance knowledge of the semantic labels can then be used in the semantic segmentation of the raw images.

Setting the Coefficients

Values of the coefficients, which determine how image areas of the plurality of raw images are fused together, can be determined in different ways.

For example, a coefficient table (lookup table or in general a database) can be provided, which contains coefficients for different image capture parameters and different semantic labels. Upon receipt of information regarding image capture parameters of the raw images, it is possible to read out the coefficients set for the semantic regions in the raw images from the coefficient table. For example, the image capture parameters can differ with respect to an illumination intensity of a light source of the microscope. For example, it can be known that sample areas are best rendered with a high illumination intensity, while image areas of (cover) glass edges oversaturate quickly and are thus more clearly visible with a lower illumination intensity; for sample carrier areas characterized by the absence of a sample, on the other hand, a medium or low illumination intensity can be preferred in order to suppress a depiction of scratches, dirt or other undesired or irrelevant details. In this example, the coefficients predetermined for the three aforementioned semantic labels based on the image capture parameters "low/medium/high illumination intensity" are respectively adopted from the coefficient table. It is thus not necessary to assess the image content of the raw images in order to set the values of the coefficients.

Alternatively, it can also be provided that the coefficients of one of the raw images are also set depending on its image content in the semantic regions. The image content of each semantic region can be evaluated separately in this case so that a coefficient can be respectively set for each semantic region of each raw image. The number of coefficients to be set can thus correspond to the number of semantic regions multiplied by the number of raw images. It is, however, not necessary to include image content from every raw image in the HDR image; consequently, it is also not necessary to set a plurality of coefficients for a raw image that does not contribute to the HDR image (depending on the corresponding selection criterion).

In order to set the coefficients, it is also possible to calculate image quality evaluations of image content in the semantic regions of each raw image based on an evaluation criterion. The evaluation criterion can in particular be an overdrive (clipping of bright image values, e.g. due to overexposure), an underdrive (e.g., underexposure), noise, a frequency distribution of brightness values (corresponding to a brightness histogram) and/or a contrast. It is then possible to set a coefficient for each semantic region in each of the raw images depending on the corresponding image quality evaluation and semantic label. Each region in a raw image is thus analyzed separately based on the evaluation criterion. The coefficients can be selected so as to increase with the image quality evaluation, although a correlation with the magnitude of the coefficients can also depend on the semantic label. For example, a maximum contrast can be desirable in image areas of a sample so that the semantic region of the raw image with the highest contrast of all raw images in this image area is assigned the largest coefficient. On the other hand, it can be preferable for interfering details to be suppressed in the image area of a sample carrier so that the semantic region of the raw image with the highest contrast of all raw images in this image area is not assigned the largest coefficient in this case.

Different evaluation criteria can be applied to the semantic regions as a function of the semantic label. For example, if the semantic label "cover slip edge" is determined for a region (or the semantic label "background", which comprises a cover slip edge), the avoidance of an overdrive can be selected as an evaluation criterion. If, on the other hand, a region with the semantic label "sample" is determined, an evaluation criterion such as a contrast that is as high as possible or a spreading of the frequency distribution of brightness values can be preferred. Different selection criteria are thus applied depending on the object in order to select image areas from the raw images for incorporation in the HDR image.

Setting the Coefficients by Means of a Machine Learning Model

The setting of the coefficients can also occur by means of a machine learning model (coefficient determination machine learning model in the following). The latter receives at least the raw images or images calculated therefrom as input and generates a mapping to the coefficients as output. The coefficient determination machine learning model can be a regression machine learning model. In principle, an output coefficient can be any value within a predetermined range of values. Alternatively, the coefficient determination machine learning model can also be designed as a classifier and generate a mapping to different classes (discrete values) for coefficients.

The coefficient determination machine learning model can in particular be trained according to the image quality evaluations described above. Training data can comprise, for example, a plurality of regions from different raw images for which an image quality evaluation has been manually specified as a label/target value. Optionally, the semantic label of the region can also be indicated. By means of such training data, the coefficient determination machine learning model learns to generate an image quality evaluation for different regions.

An input for the coefficient determination machine learning model can be a region from a raw image or an entire raw image. Moreover, the input can also comprise information regarding the division of the raw images into semantic regions as well as the corresponding semantic labels. The plurality of raw images can also collectively constitute the input. It is thus possible for the coefficient determination machine learning model to output standardized coefficients so that, for example, the sum of the coefficients of different raw images relating to the same region invariably yields the same constant value, e.g., 1. Standardized coefficients can be used directly as weights when adding together pixels of different raw images.

The coefficient determination machine learning model can be designed to calculate a linear or a non-linear mapping. It can assign coefficients pixel by pixel, wherein pixels within the same semantic region can receive the same coefficient or different coefficients. Structural information of at least one segmentation mask calculated from the raw images can also be taken into account, as described in greater detail below.

For the use of the coefficient determination machine learning model, semantic regions can have been determined in a preceding step, in particular by the machine learning model described with reference to the semantic regions. These two machine learning models can also be concatenated to form a single model. In this case, a determined semantic label and segmentation is only generated as an intermediate step in the calculation process, e.g, by a layer of a neural network, but does not have to be output from the neural network. Further variants of an aggregate machine learning model can also be utilized for an end-to-end learning. An allocation of coefficients depending on objects depicted in the regions can thus be performed by a single model. Alternatively, the model can output an HDR image directly in which image areas of the raw images are combined according to coefficients that depend on objects depicted in the regions of those raw images, wherein an explicit output of coefficients is not necessary. An explicit allocation of semantic labels to the pixels or regions is also not necessary. The model can have been learned using corresponding labelled training images, for example using a plurality of raw images and corresponding predetermined coefficient masks or predetermined HDR images which, for example, a user has created manually depending on objects depicted in the regions. The predetermined labels/target data are thus selected depending on depicted objects so that the model learns how to set values of the coefficients or combine the raw images into an HDR image in such cases. A model is thus learned which estimates the coefficients using structural information from a single raw image or all raw images. Contextual data can also be exploited, as described in greater detail later on.

Correlation of Coefficients for Semantic Regions

Coefficients for different regions in the raw images can be exploited in different ways for the generation of the HDR image.

If a coefficient is determined for a region, for example based on the raw image content and the semantic label of this region, then each pixel within this region can be allocated the same coefficient. This coefficient can constitute a weighting of the region with which the image content of the region of this raw image is incorporated in the HDR image.

Alternatively, a continuous transition can be generated by blending the coefficients of adjacent semantic regions in the same raw image. A pixel is thus subjected to a blending of the corresponding coefficients of these regions depending on its distance from a region border with the adjacent semantic regions. Such a soft transition between regions can be realized by means of machine learning in a structure-based manner or via classic blending. In principle all pixels of the same region thus receive different coefficient values, which are formed as combinations of the described coefficients. For example, three different coefficients can be calculated for a raw image with three semantic regions and these are superposed in such a manner that all pixels (or at least all pixels in a transitional area at region borders) receive different coefficient values based on which the combination into the HDR image subsequently occurs.

Combining the Raw Images into an HDR Image Using the Coefficients

The set coefficients can be used as weights during the combination of the raw images into an HDR image, for example in a linear combination of the raw images or a non-linear combination. The weighting can, as described above with reference to blending, occur pixel by pixel or uniformly for semantic regions. For example, pixels of the different raw images which correspond to one another in terms of their location can be added together according to their weighting and subsequently standardized to a valid range of values. Weights of zero can also be awarded so that the corresponding pixels or the semantic region of a raw image is not incorporated in the HDR image.

Instead of being used as weights, the set coefficients can also be used for selecting semantic regions from different raw images. For example, a semantic region is selected from the raw image for which the largest coefficient was determined for this semantic region. The selected semantic regions are then assembled to form the HDR image. In this case, each semantic region in the HDR image derives from a single raw image.

Contextual Data

Contextual data can also be exploited for the determination of semantic regions and/or for the setting of the coefficients. The contextual data can be used in particular in the aforementioned machine learning models or in a classic algorithm without a learned model. The contextual data can in particular relate to one more of the following:

A type of a sample or sample carrier depicted in the raw images: For example, geometric information relating to different types of samples or sample carriers can be known in advance, which can be exploited for a segmentation or a detection of an object in the raw images. Contextual data can also be a knowledge of which illumination parameters or image capture parameters are suitable for different types of samples, which can be exploited, for example, for the coefficient table described above.

Image capture parameters: For example, information regarding an illumination intensity, illumination/detection wavelength, camera sensitivity, exposure time (shutter speed), fluorescence excitation, contrast method, filter setting or sample stage setting can be taken into account. These parameters can provide information regarding what kind of objects are typically visible in the corresponding raw image and thus help to determine the coefficients. This information can also be useful for the determination of semantic labels for segmented regions.

Information from the other raw images: For example, structural information/information regarding depicted objects detected in one of the raw images can be used in other raw images. For example, a microscopic sample can be clearly visible in one of the raw images and unrecognizable in another.

Classification results of entire image characteristics: A classification of a raw image—or of a plurality of raw images/all raw images collectively—can occur in particular by means of an additional trained machine learning model. Different classes can differentiate between, e.g., a chamber slide, a microtiter plate, a slide with a cover slip or a Petri dish. The possible classification results permit, e.g., a predetermination of different boundary conditions for the semantic segmentation, for example which semantic labels are allowed, i.e. available for selection. In the aforementioned cases, for example for the semantic segmentation of the raw images, either round sample areas/wells or rectangular sample areas of a chamber slide or bright cover slip edges can belong to the allowed semantic labels.

Information from other capture modalities: Capture modalities can relate, for example, to other contrast methods or other overview images. These can also provide information regarding objects included or potentially included in the raw images.

Raw Images of a Scene with Different Image Brightnesses

In the present disclosure, a raw image generally denotes an image that is evaluated or taken into account for the calculation of the HDR image. In particular, it can be an image captured by a camera, an image processed therefrom or an image calculated from a plurality of images. In particular, a raw image can be a sample image of a microscopic sample captured via a microscope objective. A raw image can also be an overview image of a microscope showing, e.g., a sample carrier and a sample carrier environment. An additional overview camera, which does not view the sample carrier via a microscope objective, can also be provided on the microscope for the capture of an overview image. A raw image can also be captured by a scan in the course of which different sample points are surveyed successively such as, e.g., in the case of a laser-scanning microscope.

In principle, the different image brightnesses can result from any differences in image capture. For example, a capture process can differ for some or all of the raw images with respect to one or more of the following aspects:

Light polarizations: For example, it is possible to use linearly polarized illumination light, wherein the polarization direction differs depending on the raw image. It is also possible to use elliptically or circularly polarized light.

Light wavelengths of illumination light and/or detection light: In particular microscopic samples can comprise different elements (e.g. biological cells or cell organelles, electronic or semiconductor components) whose visibility is significantly wavelength-dependent. In the case of cell organelles, a semantic segmentation can occur on the basis of the different cell organelles, i.e. for sample components.

Illumination settings, illumination angle and dye excitations, in particular fluorescence or phosphorescence excitations: These aspects also influence which objects are visible in a raw image.

Capture modalities: The raw images can differ in particular with regard to the illumination modality used. For example, images can be captured using widefield microscopy, Gaussian lightsheet microscopy, Bessel lightsheet microscopy, STED illumination microscopy or confocal microscopy.

Camera sensitivities or different saturation levels can also lead to different image brightnesses of the raw images.

In some variants, the different image brightnesses of the raw images indicate that an average brightness differs between the raw images. Generally speaking, however, raw images of different image brightnesses are intended to be understood as including cases where merely single image pixels that correspond in different raw images in terms of their location have different brightness values. A plurality of raw images can have a same average brightness or even a same luminance histogram in this case.

Generally speaking, the scene depicted in the raw images can be of any subject. The depicted subject can comprise one or more objects, which in principle can be any structures. In particular, objects can be samples or sample components, for example biological samples or semiconductor products, sample holders or carriers, holding frames for sample carriers, cover slips, descriptive fields, or parts or surfaces of the same. The raw images can correspond with respect to their field of view and in particular be captured successively with the same camera. In the case of a corresponding field of view, each raw image covers the same area of the scene. Pixels that occupy the same position in different raw images (e.g. the pixels of an upper left corner of each raw image) can be added together according to their respective coefficients in order to form the pixel of the HDR image at the corresponding location. The raw images can alternatively show partially different or overlapping sections of the scene, i.e. their fields of view correspond only partially. It is not necessary for every raw image to contain all regions in this scenario. For example, if the intention is to create an overview image of a microtiter plate, it can be stitched together from a plurality of images captured by an overview camera. An evaluation can be carried out regarding whether a further image should be captured for one of the sections with modified image capture parameters. For example, a semantic segmentation and subsequent evaluation of the segmented regions can occur according to the image quality criteria mentioned above; if this evaluation reveals an inadequate quality (e.g. an underdrive in a sample area), then this area can be captured again with modified image capture parameters, e.g., with a higher illumination intensity. An HDR image is then generated using the additional captured raw image.

General Features

A microscopy system is understood to be an apparatus that comprises at least one microscope and a computing device. A microscope can in particular be understood to be a light microscope, an X-ray microscope, an electron microscope, a macroscope or an image-capturing device with magnification capabilities of some other design.

The computing device can be designed to be an integral part of the microscope, arranged separately in the vicinity of the microscope or be arranged at a remote location at any distance from the microscope. The computing device can also be designed to be decentralized and communicate with the microscope via a data link. It can generally be formed by any combination of electronics and software and comprise in particular a computer, a server, a cloud-based computing system or one or more microprocessors or graphic processors. The computing device can also be configured to control the microscope camera, image capture, the sample stage drive and/or other microscope components.

A computer program according to the invention comprises commands that cause the execution of one of the described method variants when said method variants are executed by a computer.

The characteristics of the invention that have been described as additional apparatus features also yield, when implemented as intended, variants of the method according to the invention. Conversely, the microscopy system can also be configured to carry out the described method variants. In particular, the computing device can be configured to carry out the described method variants and output commands for the execution of described method steps. The computing device can also comprise the described computer program.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EXAMPLE EMBODIMENTS

Different example embodiments are described in the following with reference to the figures.

Figure 1:
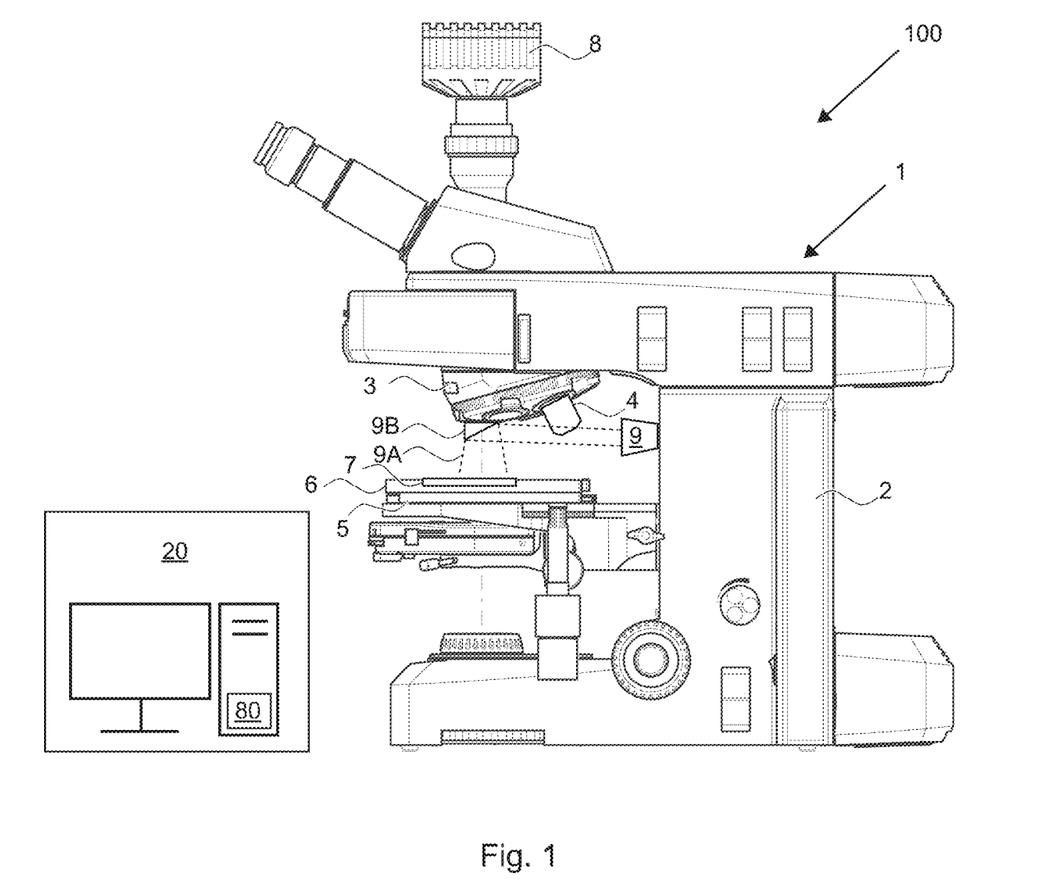
FIG. 1 is a schematic illustration of an example embodiment of a microscopy system of the invention.

FIG. 1

FIG. 1 shows an example embodiment of a microscopy system 100 according to the invention. The microscopy system 100 comprises a computing device 20 and a microscope 1, which is a light microscope in the illustrated example, but which in principle can be any type of microscope. The microscope 1 comprises a stand 2 via which further microscope components are supported. The latter can in particular include: an objective changer/revolver 3, on which an objective 4 is mounted in the illustrated example; a sample stage 5 with a holding frame 6 for holding a sample carrier 7 and a microscope camera 8. If the objective 4 has been rotated so as to be located in the microscope light path, the microscope camera 8 receives detection light from one or more samples supported by the sample carrier 7 in order to capture a sample image.

The microscope 1 also comprises an overview camera 9 for capturing an overview image of a sample carrier 7. A field of view 9A of the overview camera 9 is larger than a field of view when a sample image is captured. In the illustrated example, the overview camera 9 views the sample carrier 7 via a deflection mirror 9B. The deflection mirror 9B is arranged on the objective revolver 3 and can be selected instead of the objective 4. In variants of this embodiment, the deflection mirror or some other deflection element can also be arranged at a different site. Alternatively, the overview camera 9 can also be arranged on the stand 2 so as to view the sample carrier 7 directly without a deflection mirror 9B. In principle, an image captured by the microscope camera 8 can also constitute an overview image, in particular when a macroobjective is selected via the objective revolver 3.

The computing device 20 is intended to calculate a high-quality image (HDR image) from a plurality of captured images. To this end, the computing device 20 is configured to control the overview camera 9 to capture a plurality of overview images with different microscope settings. Additionally or alternatively, the computing device 20 is configured to control the sample camera 8 to capture a plurality of sample images with different microscope settings. The different microscope settings cause different image brightnesses, for example via different exposure times (shutter speeds), illumination light intensities, illumination wavelengths or filter settings. The sample images or overview images from which an HDR image is calculated are called raw images in the following.

The calculation of the HDR image occurs by means of a computer program 80 executed by the computing device 20, as described in the following in greater detail with reference to the further figures.

Figure 2:
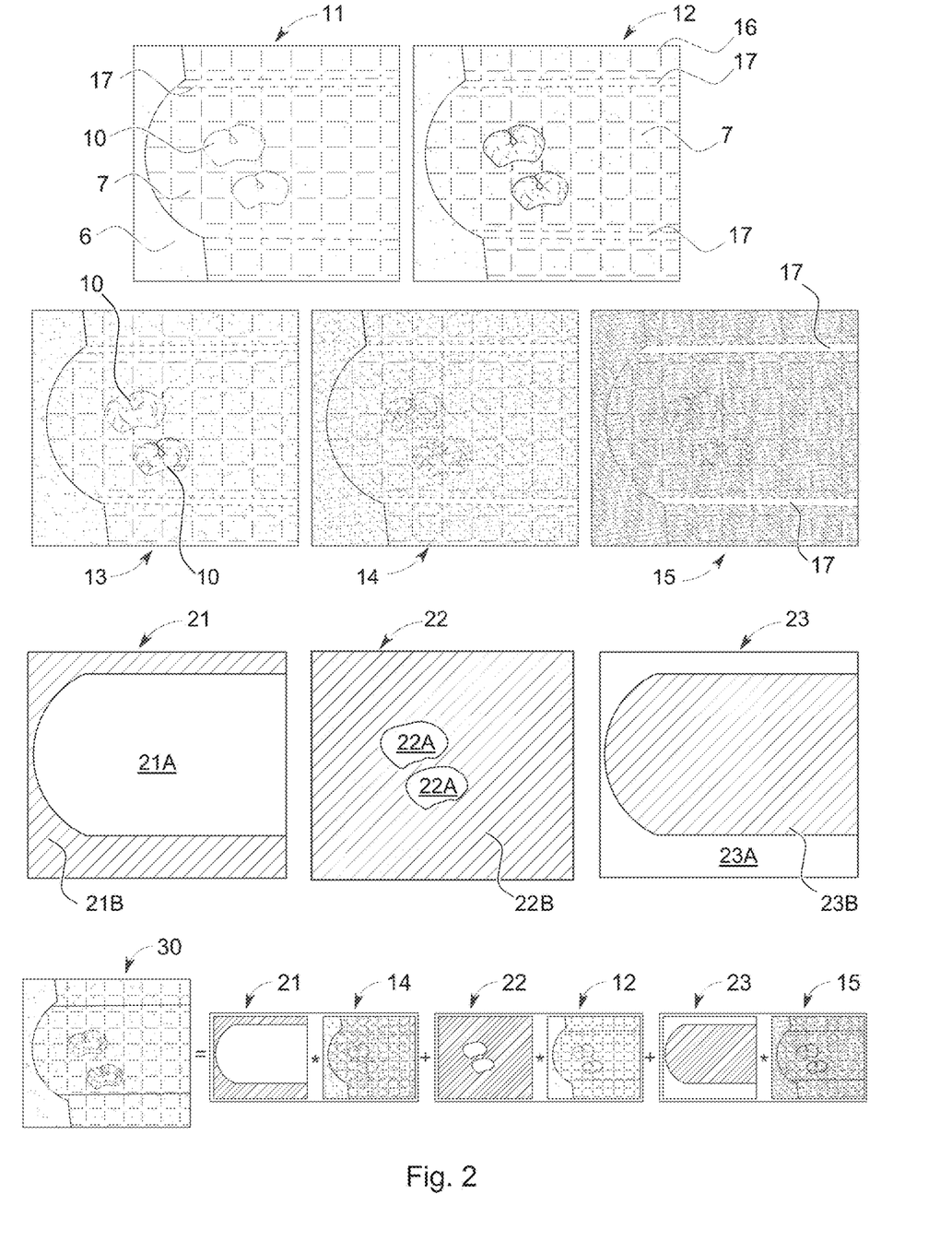
FIG. 2 is a schematic illustration of raw images and steps for calculating an HDR image according to example embodiments of the invention.

FIG. 2

FIG. 2 illustrates schematically how an HDR image 30 is calculated from a plurality of raw images 11-15 in example embodiments of the invention. Each raw image 11-15 shows the same scene, which is a captured overview of a sample carrier with microscopic samples. Reference signs are not indicated in all of the raw images 11-15 for the sake of clarity, although each raw image 11-15 shows the same scene. The raw images 11-15 differ in their image brightness, which is greatest in the raw image 11 and gradually decreases towards the raw image 15. Each raw image 11-15 shows microscopic samples 10 located on a sample carrier 7 under a cover slip. Cover slip edges 17 appear bright in the raw images 11-15. An area outside the cover slip is designated as a background 16, wherein a holding frame 6 can optionally also be considered part of the background 16.

The samples 10 are often most clearly visible at a relatively high illumination intensity and thus high image brightness, as embodied by the raw image 12 in the illustrated example. Details of the samples 10 are conversely lost in the particularly bright raw image 11 due to an oversaturation/overdrive of the brightness. In the darker raw images 13-15, details of the samples 10 are not identifiable and it is more difficult to tell the samples 10 apart from the sample carrier 7.

The cover slip edges 17 typically appear substantially brighter than the samples 10 and are readily overdriven/overexposed. The cover slip edges 17 are most clearly visible in the darkest raw image 15 in the illustrated example. A surrounding area outside the cover slip edges 17 is very dark in this image, whereby interfering background details are effectively suppressed.

The raw image 14 is the most suitable for the area of the sample carrier 7 under the cover slip. Scratches, dirt or imperfections are suppressed in the relatively dark image. Other details of the sample carrier 7 that are irrelevant for an analysis of the sample are also attenuated in the raw image 14. For image areas of the sample carrier 7 outside of image areas of the samples 10, the goal is thus not a maximum level of detail or maximum image quality (in the sense, e.g., of an image contrast that is as high as possible or a brightness dynamic range that is as wide as possible); on the contrary, interfering image content should be suppressed.

In known HDR methods, a plurality of raw images are combined based on their respective image brightnesses. In contrast, image areas of different raw images 11-15 are combined based on the objects depicted according to the invention. The different objects (e.g., samples 10, sample carrier 7 under the cover slip, background 16 outside of the cover slip) are detected automatically and differentiated from one another, i.e. provided with semantic labels.

To this end, segmentation masks 21-23 are calculated from one or more of the raw images 11-15 by means of a semantic segmentation. The segmentation mask 21 labels an image area/a region 21A of the sample carrier 7 under the cover slip, thus delimiting it from the remaining image area 21B. The segmentation mask 22 labels a region 22A of the sample, while all remaining image areas 22B are amalgamated into another region. The segmentation mask 23 labels the background 23A, thus delimiting it from the remaining image content 23B. The background 23A comprises image content outside the cover slip, i.e. outside of the cover slip edges 17, and in particular also image content of the holding frame 6. In the illustrated example, the segmentation masks 21-23 are binary masks; they can, however, also be combined into a single segmentation mask that uses more than two different pixel values for the differentiation of the regions. In a variant embodiment, the segmentation mask 21 can also label the region without a sample as the region of the sample carrier 7 under the cover slip, i.e. the region 21A minus the region 22A in FIG. 2.

The segmentation masks 21-23 are used to define how image content of the different raw images 11-15 is incorporated in an HDR image 30. A simple example is shown in the lowermost section of FIG. 2. The segmentation mask 21 is multiplied pixel by pixel by the raw image 14, which is the most suitable raw image for the region of the sample carrier 7. Each pixel of the region 21A has, e.g., a value of 1 so that the corresponding image content of the raw image 14 is included, while each pixel of the image area 21B has a value of 0 so that the corresponding image content of the raw image 14 is excluded. The segmentation mask 22 is analogously multiplied pixel by pixel by the raw image 12, in which the samples 10 are most clearly visible. The segmentation mask 23 is also multiplied pixel by pixel by the raw image 15, which suppresses a background and shows the cover slip edges without an overdrive. The sum of these three calculated images is then formed, which generates the HDR image 30. The HDR image 30 thus contains image content of different raw images 12, 14, 15, wherein the image content is not selected as a direct function of the brightness values of the raw images 11-15 (as is the case with typical HDR methods), but on the basis of a semantic segmentation.

In the described example, one of the raw images 11-15 is respectively selected for each semantic label (sample, sample carrier, background). It is then determined by means of the segmentation masks 21-23 which pixels of the selected raw images 11-15 are to be incorporated in the HDR image. This can be described as an assignment of coefficients to pixels or regions of the raw images 11-15: in the raw image 14, the pixels of the sample carrier 7, corresponding to the region 21A, are assigned a coefficient other than zero. A coefficient other than zero is likewise assigned to the pixels of the samples 10, corresponding to the region 22A, in the raw image 12. Finally, the pixels of the background, corresponding to the region 23A, are assigned a coefficient other than zero in the raw image 15. All remaining pixels or regions of the raw images 11-15 are assigned the coefficient zero. Each pixel of the raw images is then multiplied by its assigned coefficient and these images are then added together in order to obtain the HDR image 30.

The image content of a plurality of the raw images 11-15 relating to the same region 21A or 22A or 23A can also be combined via a corresponding selection of the coefficients. In this case, the coefficients can act as weights in the combination or addition of the images. A semantic region consisting of a weighted superposition of a plurality of the raw images 11-15 is thus formed in the HDR image 30. Weightings differ for the different semantic regions.

Possible calculation steps are explained in greater detail in the following with reference to FIG. 3.

Figure 3:
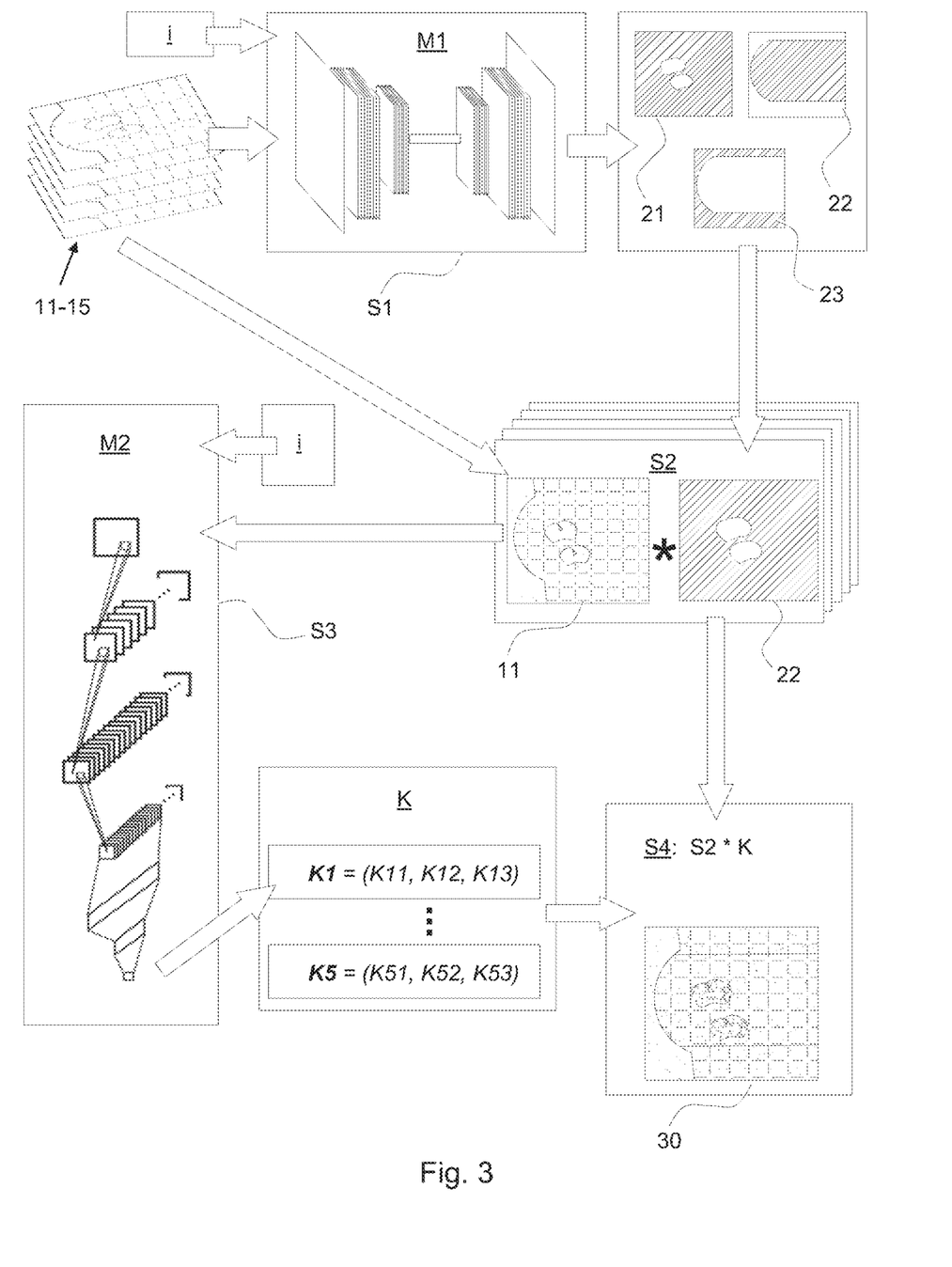
FIG. 3 is a schematic illustration of processes of an example embodiment of a method of the invention.

FIG. 3

FIG. 3 illustrates schematically calculation steps for generating an HDR image 30 from a plurality of raw images 11-15 according to example embodiments of the method according to the invention.

First, a plurality of raw images 11-15 are received, e.g. from a data memory, directly from the microscopy system 100 illustrated in FIG. 1 or from another image capture device.

Then, in step S1, a machine learning model M1 is used to calculate the semantic segmentation masks 21-23. The machine learning model M1 receives as input one or more of the raw images 11-15 or an image calculated from the same, which can be, for example, an average of the raw images 11-15. The machine learning model M1 here is a segmentation machine learning model that has been trained to generate one or more segmentation masks 21-23 from an input image. As described above, there also occurs a pixel-by-pixel classification by means of which semantic labels are specified for different image regions. Labelled training data can have been used in a training (not illustrated). Labelled training data comprises a plurality of training images corresponding to the raw images as well as an associated pixel-by-pixel specification of the corresponding semantic labels. Model parameter values of the machine learning model M1 are thereby defined in the training. The machine learning model M1 can comprise in particular a convolutional neural network (CNN) and/or a combination of different network architectures. The machine learning model M1 can optionally also be designed to utilize contextual data i. The contextual data i can provide information regarding the presence of certain objects. For example, it is possible to know which sample carrier type (e.g. a slide with a rectangular cover slip) is being used. Such contextual data i can be known in particular by means of a user input or based on a previous analysis.

After the semantic segmentation masks 21-23 have been determined, coefficients K are defined, which determine whether and to what extent a pixel from a raw image 11-15 is incorporated in the HDR image 30. The determination of the coefficients occurs in step S3 in the illustrated example by means of a further machine learning model, called the coefficient determination machine learning model M2 (model M2) here. The model M2 receives a semantic region from one of the raw images 11-15 together with the indication of the corresponding semantic label as input. In the example shown, the raw image 11 is multiplied by the segmentation mask 22 for this purpose in step S2. The segmentation mask 22 merely selects areas for this multiplication, to which end its two areas have two different values, e.g. zero and a value other than zero. In the example shown, the input for the model M2 thus corresponds to the image regions of the samples 10 from the raw image 11, wherein the associated semantic label is also indicated, i.e. that the input image areas relate to the type "sample". The model M2 is trained to perform an evaluation of input image data depending on a semantic label. For this purpose, the model M2 can have been trained with training data which comprises respective image data with associated labelling of an image quality for different semantic labels. For example, the training data for the semantic label "sample" can comprise a plurality of images or image sections of samples, a user having specified a quality evaluation manually beforehand. As described above, different evaluation criteria can be preferred for the different semantic areas. The model M2 can accordingly be trained with training data in which image data relating to different semantic labels has been evaluated in different ways. The model M2 can also exploit contextual data i in the process. The contextual data i can indicate, for example, a sample type, it being known for different sample types whether the best image quality is more likely to be achieved in brighter or darker images. As an output, the model M2 generates a coefficient for the input image region, i.e. the coefficient K11 for the region 21A of the raw image 11 in the illustrated example. The remaining semantic areas of the same raw image 11 are now successively input into the model M2, which calculates the coefficient K12 for the region 22A of the raw image 11 and the coefficient K13 for the region 23A of the raw image 11. The coefficients K11, K12, K13 can be combined as a coefficient vector K1 for the raw image 11. The same process is carried out analogously for the other raw images, whereby respective coefficient vectors are formed, in the illustrated example up to the coefficient vector K5 containing the coefficients K51, K52 and K53 for the raw image 15. The entries of all coefficient vectors K1-K5 are collectively called coefficients K.

The HDR image 30 is then calculated in step S4 from the raw images 11-15 using the coefficients K. In the illustrated example, the semantic regions of the raw images 11-15 determined in step S2 are multiplied by the respective coefficients; all image data is subsequently added together.

The generated HDR image 30 is characterized in that sample structures are particularly clearly visible, no image area is overdriven/overexposed and details outside the sample areas are suppressed. The HDR image 30 is thus superior to a single captured raw image in terms of quality.

In a variant embodiment, the model M2 can be designed and trained to carry out an image-to-image mapping, wherein different pixel values in the output image are the corresponding coefficients. An output of the model M2 thus constitutes a segmentation mask with associated coefficients for one of the raw images 11-15. In this scenario, the outputs of the model M2 are multiplied by the associated raw images 11-15 and then added together in step S4.

In a further variant of the illustrated embodiment, the two machine learning models M1 and M2 can be constituted by a single machine learning model. Segmentation masks thus do not have to be output by the machine learning model. Rather, the coefficients K are output directly, although it is also possible to integrate step S4 into the machine learning model so that the HDR image 30 is output directly.

The illustrated embodiment can also be varied with respect to how borders of semantic regions are handled, for example the borders between the regions/image areas 21A and 21B of the segmentation mask 21 in FIG. 2. In the examples described up to this point, there is a significant jump at the border between two coefficients. Alternatively, a blending, i.e. a continuous or gradual transition, can occur between the two associated coefficients. For example, the coefficients K11, K12, K13 can be determined for the regions 21A, 22A, 23A with the model M2, as described for the raw image 11. In this scenario, however, the coefficient K11 is not assigned to every pixel in the region 21A of the raw image 11; rather, there is a continuous transition between the coefficients K11 and K13 in the area of the border between the region 21A and the image area 216/23A. The pixels of the raw image 11 are thus assigned different (linear) combinations of the determined coefficients K11-K13.

Figure 4:
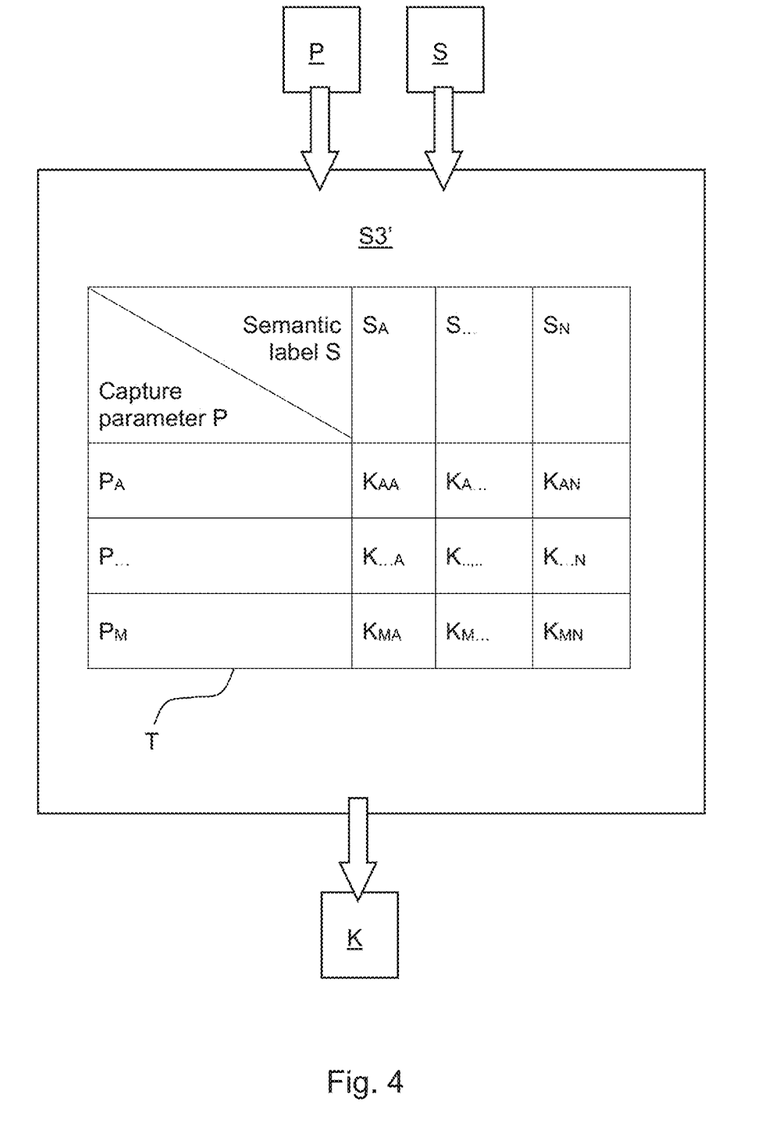
FIG. 4 is a schematic illustration of a process of an example embodiment of a method of the invention.

FIG. 4

FIG. 4 shows an alternative step S3', which replaces step S3 of the preceding figure in some example embodiments of the invention.

In the example shown in FIG. 4, a coefficient table T containing respective values of coefficients K for different semantic labels S and different image capture parameters P is used. The semantic labels S can discriminate between, for example, "sample", "sample carrier" and "background". The image capture parameters P can indicate, for example, different illumination intensities and/or exposure times. In principle, there can be any number of different semantic labels S and image capture parameters P. In step S3', a semantic label S and the image capture parameter P belonging to one raw images 11-15 is entered as input. The semantic label S can have been determined, e.g., according to step S1 of FIG. 3. The image capture parameter P is received directly from the image capture device or is retrieved from a memory or can have been determined at the capture of the raw image 11-15 in question by the computing device 20. Depending on the input semantic label S and the input value of the image capture parameter P, a corresponding entry of the coefficient table T is output as the coefficient K. Alternatively, a (linear) combination of a plurality of entries can be output as the coefficient K, which is expedient, e.g., when the input value of the image capture parameter P indicates an illumination intensity that lies between two illumination intensities included in the coefficient table T.

Further variations of the illustrated examples are possible. In particular, it is possible for the machine learning models M1 and M2 of FIG. 3 to be replaced by classic image processing algorithms without machine learning models. A segmentation can be created using, for example, edge detection filters. Depending on the form of the segmented content, a classification can then occur, whereby the semantic segmentation masks 21-23 can be created. The determination of coefficients can occur, for example, by evaluating the image regions input into the model M2 in FIG. 3 based on an image quality criterion, for example based on its contrast or its noise.

The computing device 20 and the computer program 80 of FIG. 1 can be configured to carry out the processes described with reference to FIG. 2, FIG. 3 and/or FIG. 4. The described example embodiments are purely illustrative and can be varied within the scope of the attached claims. In particular the sample images and overview images cited with reference to FIG. 1 are merely examples of raw images and in principle any other images with different image brightnesses can be used as raw images. The raw images illustrated in FIG. 2 also do not have to be identical, as illustrated, with respect to their orientation and magnification so as to render image content identical in all raw images 11-15 with respect to its position; rather, it is sufficient if the depicted image content is overlapping.

LIST OF REFERENCES

1 Microscope
2 Stand
3 Objective revolver
4 Microscope objective
5 Sample stage
6 Holding frame
7 Sample carrier
8 Microscope camera
9 Overview camera
9A Field of view of the overview camera
9B Deflection mirror
10 Sample
11-15 Raw images
16 Background
17 Cover slip edge
20 Computing device
21-23 Segmentation masks
21A Image area/region "sample carrier" of the segmentation mask 21
21B Inactive image area of the segmentation mask 21
22A Image area(s)/region(s) "sample" of the segmentation mask 22
22B Inactive image area of the segmentation mask 22
23A Image area/region "background" of the segmentation mask 23
23B Inactive image area of the segmentation mask 23
30 HDR image
80 Computer program of the invention
100 Microscopy system of the invention
i Contextual data
K Coefficients, comprising the coefficient vectors K1-K5 with individual coefficients K11-K53
M1 Machine learning model
M2 Coefficient determination machine learning model
P Image capture parameter
S Semantic label
S1-S4, S3' Steps of example embodiments of a method according to the invention
T Coefficient table

We claim:

1. A microscopy system for generating an HDR image, comprising
    a microscope for capturing a plurality of raw images showing a scene with different image brightnesses; and
    a computing device, which is configured to generate the HDR image by combining at least two of the raw images by:
    receiving information regarding image capture parameters of the raw images;
    setting coefficients for different regions in the raw images depending on objects depicted in the regions, wherein the coefficients define whether or to what extent pixels of the raw images are incorporated in the HDR image; and
    generating the HDR image by combining the raw images based on the set coefficients,
    wherein the setting coefficients for different regions includes:
        determining semantic regions in the raw images by dividing each raw image into regions and assigning said regions respective semantic labels; and
        deriving coefficients for each of the raw images depending on at least the semantic labels of the included semantic regions,
    wherein the setting coefficients for the semantic regions in the raw images uses a coefficient table containing coefficients for different image capture parameters of the raw images and different semantic labels.

2. A method for generating an HDR image, comprising
    receiving a plurality of raw images showing a scene with different image brightnesses;
    setting coefficients for different regions in the raw images depending on objects depicted in the regions, wherein the coefficients define whether or to what extent pixels of the raw images are incorporated in the HDR image; and generating the HDR image by combining at least two of the raw images based on the set coefficients,
    wherein the setting coefficients for different regions includes:
        determining semantic regions in the raw images and assigning said regions respective semantic labels; and deriving coefficients for each of the raw images depending on at least the semantic labels of the included semantic regions;
wherein determination of the semantic labels occurs based on one or more of the raw images or based on another image, and
wherein the semantic labels of the semantic regions discriminate between at least two or more of the following predefined classes: sample carrier, cover slip, sample, holding frame, and background.

3. The method according to claim 2,
wherein a coefficient table containing coefficients for different image capture parameters and different semantic labels is provided;
wherein information regarding image capture parameters of the raw images is received; and
wherein the setting of coefficients for the semantic regions in the raw images occurs based on the coefficient table.

4. The method according to claim 2,
wherein the coefficients of one of the raw images are also set depending on image content of the one of the raw images in the semantic regions.

5. The method according to claim 2,
wherein a coefficient is set for each semantic region of each raw image.

6. The method according to claim 2,
wherein the setting of the coefficients comprises the following steps:
calculating image quality evaluations of image content in the semantic regions of each raw image based on an evaluation criterion relating to at least one of: an overdrive, an underdrive, noise, a frequency distribution of brightness values, or a contrast; and
setting the coefficient for each semantic region in each of the raw images depending on the respective image quality evaluation and semantic label.

7. The method according to claim 2,
wherein different evaluation criteria are applied for the semantic regions depending on the respective semantic labels.

8. The method according to claim 2,
wherein the setting of the coefficients occurs by means of a coefficient determination machine learning model, which receives at least the raw images as input and sets the coefficients as output.

9. The method according to claim 8,
wherein the coefficient determination machine learning model receives the raw images and additionally information regarding the division into semantic regions and the corresponding semantic labels for the raw images as input.

10. The method according to claim 2,
wherein, for a continuous transition, the coefficients of adjacent semantic regions in the same raw image are blended so that a pixel is subjected to a blending of the corresponding coefficients of these adjacent semantic regions depending on a distance of the pixel from a region border with the adjacent semantic regions.

11. The method according to claim 2,
wherein the raw images show partially different or overlapping sections of the scene,
the method further comprising evaluating whether a further image should be captured with modified image capture parameters for one of the sections.

12. The method according to claim 2,
wherein the semantic regions in the raw images are determined with the help of a machine learning model trained for this purpose, which comprises a segmentation machine learning model, an instance segmentation machine learning model, or a detection machine learning model.

13. The method according to claim 12,
wherein only one of the raw images or some of the raw images is input into the machine learning model, wherein the machine learning model thereby calculates at least one segmentation mask,
wherein a division into semantic regions occurs in the remaining raw images according to the calculated at least one segmentation mask.

14. The method according to claim 2,
wherein, when determining semantic regions or when determining the coefficients, contextual data relating to one or more of the following characteristics is exploited:
a type of the sample or a type of the sample carrier;
image capture parameters;
information from other raw images;
classification results of entire image characteristics;
information from other capture modalities.

15. The method according to claim 2,
wherein the set coefficients are used for selecting semantic regions from different raw images and the selected semantic regions are subsequently assembled into the HDR image.

16. The method according to claim 2,
wherein a process for capturing the raw images differs with respect to one or more of the following characteristics:
Light polarizations;
Light wavelengths of illumination light;
Light wavelengths of detection light;
Illumination settings;
Dye excitations;
Illumination angles;
Capture modalities and
Camera sensitivities.

17. A computer program with commands which are stored on a non-transitory computer-readable medium and which, when executed by a computer, cause the execution of the method according to claim 2.

18. The method according to claim 2,
wherein each pixel within one of the semantic regions of one of the raw images is assigned the same coefficient.

19. The method according to claim 2,
wherein the set coefficients are used as weights during the combination of the raw images into an HDR image.

20. A method for generating an HDR image, comprising
receiving a plurality of raw images showing a scene with different image brightnesses;
setting coefficients for different regions in the raw images depending on objects depicted in the regions, wherein the coefficients define whether or to what extent pixels of the raw images are incorporated in the HDR image; and
generating the HDR image by combining at least two of the raw images based on the set coefficients,
wherein the setting coefficients for different regions includes:
determining semantic regions in the raw images and assigning said regions respective semantic labels; and
deriving coefficients for each of the raw images depending on at least the semantic labels of the included semantic regions;

wherein determination of the semantic labels occurs based on one or more of the raw images or based on another image, and wherein the semantic labels of the semantic regions discriminate between predefined classes, at least two or more of which relate to microscopic samples, sample holders, or sample surroundings.

\* \* \* \* \*